United States Patent
Kühn et al.

[11] Patent Number: 5,799,089
[45] Date of Patent: Aug. 25, 1998

[54] SYSTEM AND APPARATUS FOR BLOCKWISE ENCRYPTION/DECRYPTION OF DATA

[75] Inventors: Gideon Jacobus Kühn, Pretoria, South Africa; Donald Watts Davies, Middlesex, Great Britain; Simon Paul Ashley Rix, Transvaal, South Africa

[73] Assignee: Irdeto B.V., Netherlands

[21] Appl. No.: 624,541

[22] PCT Filed: Oct. 7, 1994

[86] PCT No.: PCT/NL94/00245

§ 371 Date: Apr. 12, 1996

§ 102(e) Date: Apr. 12, 1996

[87] PCT Pub. No.: WO95/10906

PCT Pub. Date: Apr. 20, 1995

[30] Foreign Application Priority Data

Oct. 14, 1993 [NL] Netherlands ............... 9301784

[51] Int. Cl.$^6$ ............................................. H04L 9/00
[52] U.S. Cl. ............................................. 380/37; 380/49
[58] Field of Search ............................. 380/29, 37, 46, 380/49

[56] References Cited

U.S. PATENT DOCUMENTS

| | | | |
|---|---|---|---|
| 4,918,728 | 4/1990 | Matyas et al. | 380/49 |
| 5,294,208 | 3/1994 | Schlafly et al. | 380/49 |
| 5,301,231 | 4/1994 | Abraham et al. | 380/49 |
| 5,345,508 | 9/1994 | Lynn et al. | 380/46 |
| 5,438,622 | 8/1995 | Normile et al. | 380/46 |
| 5,455,862 | 10/1995 | Hoskinson | 380/49 |
| 5,511,123 | 4/1996 | Adams | 380/29 |

OTHER PUBLICATIONS

C.E. Roberts, "System–Level Data Encryption Comes of Age with Speed and Flexibility", *Electro*, vol. 17, May 1992, pp. 336–339.

IBM Technical Disclosure Bulletin, "Stack Processes for Increased Encryption Security", vol. 33, No. 10A, Mar. 1991, pp. 96–97.

*Primary Examiner*—Salvatore Cangialosi
*Attorney, Agent, or Firm*—Westman, Champlin & Kelly, P.A.; S. Koehler

[57] ABSTRACT

A system for encrypting and decrypting digital data wherein the data is divided in packets of N blocks $X(1) \ldots X(N)$ of $2^m$ bits, comprises an encryption device and a decryption device. The encryption device reverses the sequence of the blocks $X(1) \ldots X(N)$ before a XOR operation and next an encryption operation by means of an encryption algorithm E is carried out on each block of a packet. Thereby the following encrypted blocks $Y(1) \ldots Y(N)$ are formed: $Y(1)=E[X(N)+IV]$, $Y(i)=E[X(N-i+1)+Y(i-1)]$ for $i>1$ and $i \leq N$. The encrypted blocks $Y(1) \ldots Y(N)$ are transferred by a sender in reversed sequence $Y(N) \ldots Y(1)$ to a receiver. The decryption device at the receiver obtains the original blocks $X(1) \ldots X(N)$ by carrying out a decryption operation by means of a decryption algorithm D and next a XOR operation on each block $Y(N) \ldots Y(1)$ received. Thereby the original blocks are obtained as follows: $X(i)=D[Y(N-i+1)]+Y(N-i)$ for $i=1, 2, \ldots, N-1$; $X(N)=D[Y(1)]+IV$.

12 Claims, 2 Drawing Sheets

SYSTEM AND APPARATUS FOR BLOCKWISE ENCRYPTION/DECRYPTION OF DATA

BACKGROUND OF THE INVENTION

The invention relates to a system for encrypting and decrypting digital data.

A known system uses the so-called cipher block chaining (CBC) method. Although an encryption of digital data can be obtained by this known CBC method, which encryption can hardly be decrypted by unauthorized persons, the known system has some disadvantages. These disadvantages are present in particular in applications in the field of digital television, wherein a minor number of senders and a very high number of receivers are involved and high processing speeds are required in view of the large amount of digital data to be transmitted. In using the usual CBC method, a buffer storage is required in the receiver, in which four block lengths of digital data can be stored. Such a large buffer storage increases the costs of the receiver which is a major disadvantage in systems with a high number of receivers. Further, a header with a fixed bit pattern is generally provided at the beginning of each packet of digital data. As in the known CBC method, the first block is combined with a fixed initial vector, this could result in a recognizable bit pattern in the encrypted data. Such a recognizable bit pattern provides a potential attack for decrypting the encrypted data by unauthorized persons.

SUMMARY OF THE INVENTION

The invention aims to provide a system of the above-mentioned type wherein the disadvantages of the known system are obviated in an effective manner and which is particularly suitable for application in the field of digital television.

In this manner a system is obtained wherein at the receiver side a buffer storage is required of two times the block length in bits so that the costs are decreased. By reversing the sequence of the blocks, it is further obtained that the initial vector is combined with variable data, whereby the header part of the packet as last block is combined with a variable bit pattern, so that it is guaranteed that a fixed pattern cannot be found in the encrypted blocks. The method used in the system according to the invention can be indicated as reverse cipher block chaining or RCBC method.

BRIEF DESCRIPTION OF THE DRAWINGS

The invention will be further explained by reference to the drawings in which an embodiment of the system of the invention is schematically shown.

DETAILED DESCRIPTION OF THE PREFERRED EMBODIMENTS

Figure 1:
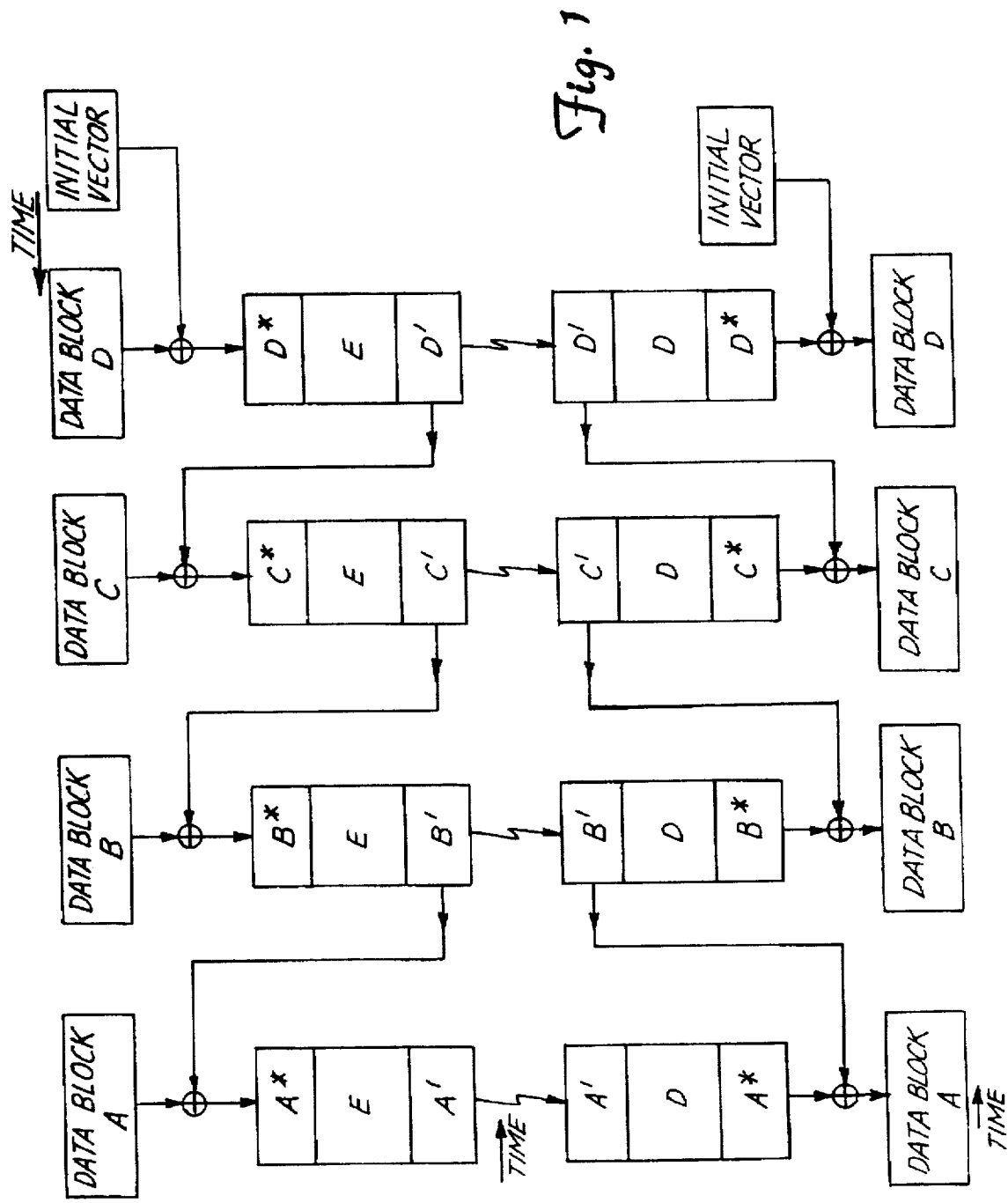
FIG. 1 schematically shows the RCBC method used in the system of the invention.

Referring to FIG. 1 there is very schematically shown an embodiment of the encryption and decryption method used in the system of the invention. In the embodiment shown it is assumed that packets of data are divided in four blocks A, B, C and D each having a length of 64 bits. At the sender side the sequence of the blocks A-D is reversed in an encryption device not further shown, so that the blocks D, C, B and A are encrypted successively in time. In the first encryption step block D is subjected to an exclusive- or operation or XOR operation indicated by the symbol +. In the first step, the XOR operation is carried out with an initial vector IV also having a length of 64 bits. As shown in FIG. 1, a data block D* is obtained in this manner, which is thereafter subjected to an encryption operation by means of an encryption algorithm E which will be further explained hereafter. Thereby the encrypted data or cypher text block D' is finally obtained.

In the second step, the data block C and the encrypted data block D' are subjected to a XOR operation providing an encoded data block C* which is thereafter encrypted by means of the encryption algorithm E into an encrypted data block C'. In the next steps the encrypted data blocks B' and A' are obtained in a corresponding manner.

Before transferring the data, the sequence is again reversed, so that the encrypted data blocks A', B', C' and D' are successively transferred.

At the receiver side, the received encrypted data block A' is subjected in the first step to a decryption operation by means of a decryption algorithm D, so that the encoded data block A* is obtained. This encoded data block A* is thereafter subjected to a XOR operation with the second encrypted data block B' received by now, so that the original data block or plain text block A is obtained.

As schematically shown, the next original data blocks B and C are obtained in a corresponding manner, whereafter the last data block D is obtained by a XOR operation of the encoded data block D* and the initial vector IV.

In a more general way it can be stated that the following operation is carried out at the sender side.

The digital data is divided into packets of N blocks $X(1), X(2) \ldots X(N)$, wherein each block has $2^m$ bits. The sequence of the blocks is reversed before the encryption operation into $X(N), X(N-1) \ldots X(1)$. This sequence of blocks is encrypted by the encryption algorithm E in the following manner:

$$Y(1)=E\ [X(N)+IV]$$

$$Y(i)=E\ [X(N-i+1)+Y(i-1)] \text{ for } i>1 \text{ and } i \leq N.$$

The sequence of these encrypted blocks is again reversed, so that the sequence $Y(N), Y(N-1) \ldots Y(1)$ is transferred to the receiver.

At the receiver side the original data blocks are obtained by means of the decryption algorithm D as follows:

$$X(i)=D\ [Y(N-i+1)]+Y(N-i) \text{ for } i=1, 2 \ldots, N-1$$

$$X(N)=D\ [Y(1)]+IV.$$

The RCBC method described shows the significant advantage that a buffer storage at the receiver is required for storing two data blocks only. Compared to known systems the required storage at the receiver is halved. This is obtained at the expense of a larger storage at the sender, as the sequence of the data blocks within each packet has to be reversed at the sender. Thereby the system of the invention is suitable in particular for applications in systems wherein only one or some senders are provided and a large number of receivers, as for example in digital television broadcast systems. Further, the system described shows the advantage that during encryption the initial vector is combined with a variable data block whereas the last encrypted data block generally comprising a header with a fixed pattern is thereby combined with a variable encrypted data block. Thereby it is avoided that a fixed pattern caused by the header part of each packet could be recognized in the encrypted data.

Finally, the system of the invention has the advantage that the pipeline delay at the receiver side, i.e. the delay time until a first decrypted data block appears, is restricted to one block length in time, whereas this pipeline delay is three block lengths in time for the known CBC method.

Figure 2:
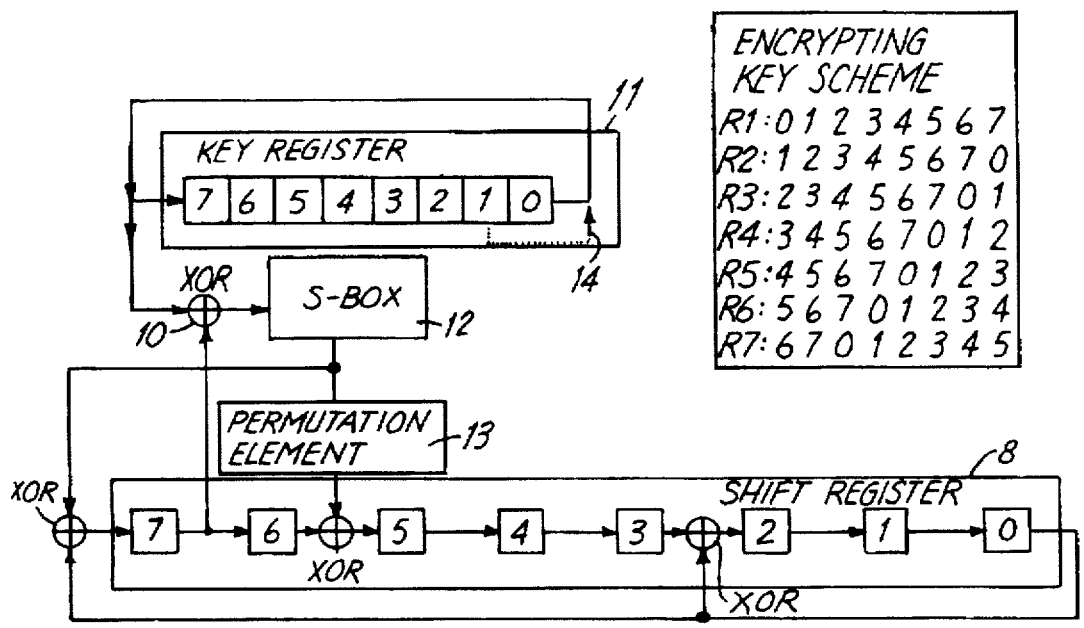
FIG. 2 schematically shows the operation of the encrypting device of the invention by means of a block diagram.
Figure 3:
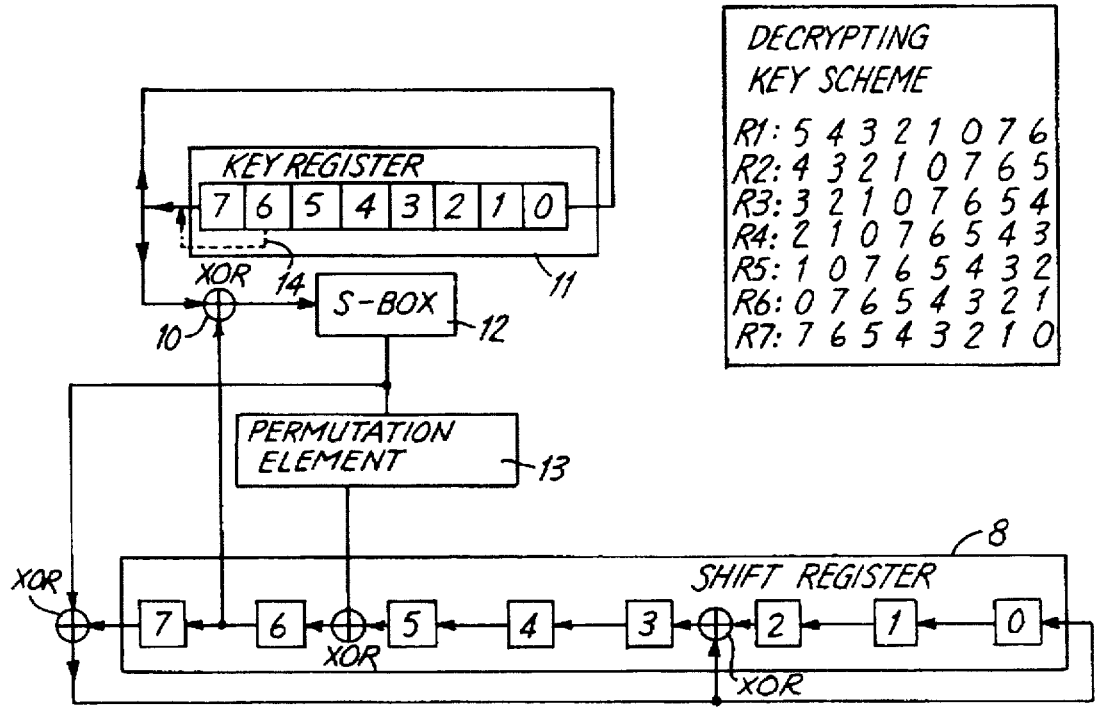
FIG. 3 schematically shows the operation of the decryption device of the invention by means of a block diagram.

The encryption algorithm E and the decryption algorithm D used in the system of the invention will be further explained hereafter by reference to FIGS. 2 and 3.

As shown in FIG. 2, the encryption device comprises a shift register 8 having eight memory elements 0–7 each having 8 bits. It is also possible to have a different number of bits for each memory element. A XOR element is provided between the memory elements 2 and 3, 5 and 6, 0 and 7, respectively, said XOR element being indicated by + and having a XOR gate for each bit. When an output or input is mentioned hereinafter, actually a number of output or input lines corresponding with the number of bits of the memory elements is indicated. The output of memory element 0 of the shift register 8 is connected to the XOR elements preceding the memory elements 2 and 7. The output of memory element 7 is connected to a XOR element 10 to which a cycling key register 11 is also connected.

This key register 11 also comprises eight memory elements 0–7 each having 8 bits. A key of 64 bits is stored in this key register. The output of XOR element 10 is connected to a look-up table 12 of 256 elements each having 8 bits, which look-up table is also referred to as substitution module or S-box. The output of the S-box 12 is applied to the XOR element ahead of memory element 7 of the shift register 8 and after going through a permutation element 13 to the XOR element between memory elements 5 and 6 of the shift register 8.

The cycling key register 11 is synchronously stepped with the shift register 8. In order to encrypt a data block, the data block is loaded into the shift register, whereafter the data is shifted one memory element to the right after each step, wherein the contents of the memory element 0 is shifted to the memory element 7. After eight steps the data block is shifted one round and the key in the key register 11 is advanced one step as indicated schematically by a dashed line 14. Thereafter the encryption process is repeated six times. The shifting of the key in the key register 11 is shown in a table in FIG. 2, wherein each cycle of eight steps is indicated by R1, R2 . . . R7. Of course it is also possible to repeat the encryption process a higher or lower number of times.

In contrast to known encryption algorithms, like the DES algorithm, a single relatively large S-box is used in the described encryption device instead of a plurality of small S-box elements. The use of one large S-box shows the advantage that a very strong non-linearity is introduced in one step. The byte of memory element 7 is directly combined with a byte of the key and the operation provided by the S-box provides a strong non-linearity introduced in memory element 7 and after permutation through the permutation element 13 in memory element 5. As the byte is modified in a non-linear manner at the output of the S-box 12 and is introduced into the shift register 8 at two locations, a rapid diffusion of this non-linearity is obtained. Thereby a better encryption is obtained then would be possible by means of a plurality of small S-box elements. The use of the XOR element between the memory elements 2 and 3 of the shift register 8 shows the advantage that the number of possible keys at a certain bit length of the key is doubled as compared to the known DES algorithm because there is no connection anymore between the complement of a data block with the complement of the key and the complement of the encrypted data block.

As shown in FIG. 3, decryption is obtained by the reversed operation.

It is noted that the described RCBC method of the invention can also be applied in such a manner that the sequence of the blocks of each packet is not reversed before the encryption. In this case the blocks will be received at the receiver in reversed sequence X(N), X(N−1) . . . X(1). In this case the blocks can be reversed at the receiver.

The invention is not restricted to the above-described embodiment which can be varied in a number of ways within the scope of the invention.

We claim:

1. A system for encrypting and decrypting digital data, wherein the data is divided into packets of N blocks (X(1) . . . X(N)) of $2^m$ bits, said system comprising:

an encryption device having encryption means for performing a XOR operation (+) and then an encryption operation by means of an encryption algorithm (E) on each block of a packet, wherein encrypted blocks (Y(1) . . . Y(N)) are obtained according to $$Y(1)=E\ [X(N)+IV]$$

$$Y(i)=E\ [X(N-i+1)+Y(i-1)] \text{ for } i>1 \text{ and } i \leq N,$$

where IV is an initial vector, and wherein said encryption means reverses the sequence of the blocks (X(1) . . . X(N)) before carrying out the encryption and XOR operations, and wherein said encryption device includes means for reversing the encrypted blocks (Y(1) . . . Y(N)) before transferring the encrypted blocks (Y(1) . . . Y(N)); and a decryption device having means for performing a decryption algorithm (D) and then the XOR operation on each encrypted block (Y(1) . . . Y(N)), wherein the original blocks (X(1) . . . X(N)) are obtained according to $$X(i)=D\ [Y(N-i+1)]+Y(N-1) \text{ for } i=1, 2 \ldots, N-1$$

$$X(N)=D\ [Y(1)]+IV.$$

2. The system according to claim 1, wherein for carrying out the decryption algorithm the decryption device comprises a shift register with eight memory elements (0, 1, . . . 7) each having $2^k$ bits and a key register with eight memory elements (0, 1, . . . 7) of $2^k$ bits, said registers being controlled synchronously for shifting data in parallel in a direction of memory element (0) to memory element (7), wherein the output of memory element (7) is coupled to memory element (0), and wherein the output of memory element (6) of the shift register and the output of memory element (7) of the key register are subjected to a XOR operation and the output of the XOR operation is processed by a look-up table with 256 elements each having $2^k$ bits and the output obtained is applied to a XOR operation at the output of memory element (5) at the input of memory element (0), respectively.

3. The system according to claim 2, wherein the output of the look-up table is subjected to a permutation before the XOR operation ahead of the output of memory element (5).

4. The system according to claim 2, wherein the third memory element (3) receives as an input a XOR operation of the output of memory elements (2 and 7).

5. The system according to claim 2, wherein the original data loaded into the shift register is processed in eight steps, whereafter the key in the key register is advanced by one memory element, whereafter processing in eight steps is repeated a number of times before the decrypted data is retrieved from the shift register.

6. The system according to claim 1, wherein for carrying out the encryption algorithm (E) the encryption device comprises a shift register with eight memory elements (0, 1, ... 7) each having $2^k$ bits and a key register with eight memory elements (0, 1, ... 7) of $2^k$ bits, said registers being controlled synchronously for shifting data in parallel in a direction of memory element (7) to memory element (0), wherein the output of memory element (0) is coupled to memory element (7), and wherein the output of memory element (7) of the shift register and the output of memory element (0) of the key register are subjected to a XOR operation and the output of the XOR operation is processed by a look-up table with 256 elements each having $2^k$ bits and the output obtained is applied to a XOR operation at the input of memory element (5) and together with the output of the memory element (0) at the input of the memory element (7), respectively.

7. The system according to claim 6, wherein the output of the look-up table is subjected to a permutation before the XOR operation ahead of the input of memory element (5).

8. The system according to claim 6, wherein the second memory element (2) receives as input a XOR operation of the output of memory elements (0 and 3).

9. The system according to claim 6, wherein the original data loaded into the shift register is processed in eight steps, whereafter the key in the key register is advanced by one memory element, whereafter processing in eight steps is repeated a number of times before the encrypted data is retrieved from the shift register.

10. An encryption device for a system for encrypting and decrypting digital data, wherein the data is divided into packets of N blocks (X(1) ... X(N)) of $2^m$ bits, the encryption device having encryption means for performing a XOR operation (+) and then an encryption operation by means of an encryption algorithm (E) on each block of a packet, wherein encrypted blocks (Y(1) ... Y(N)) are obtained according to $Y(1)=E\ [X(N)+IV]$ $Y(i)=E\ [X(N-i+1)+Y(i-1)]$ for $i>1$ and $i \leq N$, where IV is an initial vector, and wherein said encryption means reverses the sequence of the blocks (X(1) ... X(N)) before carrying out the encryption and XOR operations.

11. A decryption device for a system for encrypting and decrypting digital data, wherein the data is divided into packets of N blocks (X(1) ... X(N)) of $2^m$ bits and encrypted into packets of N blocks (Y(1) ... Y(N)), the decryption device having means for performing a decryption algorithm (D) and then a XOR operation (+) on each encrypted block (Y(1) ... Y(N)), wherein the original blocks (X(1) ... X(N)) are obtained according to $X(i)=D\ [Y(N-i+1)]+Y(N-i)$ for $i=1, 2 \ldots, N-1$ $X(N)=D\ [Y(1)]+IV$ where IV is an initial vector.

12. A method for encrypting and decrypting digital data, wherein the data is divided into packets of N blocks (X(1) ... X(N)) of $2^m$ bits, said system comprising:

reversing the blocks (X(1) ... X(N)) of a packet;

encrypting the blocks (X(1) ... X(N)), the step of encrypting including performing a XOR operation (+) and then an encryption operation by means of an encryption algorithm (E) on each block of a packet, wherein encrypted blocks (Y(1) ... Y(N)) are obtained according to $Y(1)=E\ [X(N)+IV]$ $Y(i)=E\ [X(N-i+1)+Y(i-1)]$ for $i>1$ and $i \leq N$, where IV is an initial vector;

reversing the encrypted blocks (Y(1) ... Y(N));

transferring the encrypted blocks (Y(1) ... Y(N)) to a receiver; and decrypting the encrypted blocks (Y(1) ... Y(N), the step of decrypting including performing a decryption algorithm (D) and then the XOR operation on each encrypted block (Y(1) ... Y(N)), wherein the original blocks (X(1) ... X(N)) are obtained according to $X(i)=D\ [Y(N-i+1)]+Y(N-i)$ for $i=1, 2 \ldots, N-1$ $X(N)=D\ [Y(1)]+IV.$

\* \* \* \* \*

UNITED STATES PATENT AND TRADEMARK OFFICE
CERTIFICATE OF CORRECTION

PATENT NO.    : 5,799,089
DATED         : August 25, 1998
INVENTOR(S) : Kühn et al.

It is certified that error appears in the above-identified patent and that said Letters Patent is hereby corrected as shown below:

On the title page, item:

[56] References Cited

U.S. PATENT DOCUMENTS

Second listed reference, replace "5,294,208" with --5,297,208".

Signed and Sealed this

Twenty-third Day of February, 1999

Attest:

Q. TODD DICKINSON

Attesting Officer

Acting Commissioner of Patents and Trademarks